US012294145B2

(12) United States Patent
Dubost et al.

(10) Patent No.: US 12,294,145 B2
(45) Date of Patent: May 6, 2025

(54) RADOME FOR MOTOR VEHICLE COMPRISING A DECORATIVE PATTERN

(71) Applicant: OPmobility SE, Lyons (FR)

(72) Inventors: Elise Dubost, Sainte-Julie (FR); Alaeddine Landoulsi, Sainte-Julie (FR); Frédéric Stablo, Sainte-Julie (FR)

(73) Assignee: OPmobility SE, Lyons (FR)

( * ) Notice: Subject to any disclaimer, the term of this patent is extended or adjusted under 35 U.S.C. 154(b) by 176 days.

(21) Appl. No.: 17/757,853

(22) PCT Filed: Dec. 23, 2020

(86) PCT No.: PCT/EP2020/087739
§ 371 (c)(1),
(2) Date: Jun. 22, 2022

(87) PCT Pub. No.: WO2021/130295
PCT Pub. Date: Jul. 1, 2021

(65) Prior Publication Data

US 2023/0039346 A1 Feb. 9, 2023

(30) Foreign Application Priority Data

Dec. 24, 2019 (FR) ....................................... 1915533

(51) Int. Cl.
*H01Q 1/42* (2006.01)
*H01Q 1/32* (2006.01)

(52) U.S. Cl.
CPC ............. *H01Q 1/42* (2013.01); *H01Q 1/3233* (2013.01); *H01Q 1/3283* (2013.01)

(58) Field of Classification Search
CPC ............ H01Q 1/40; H01Q 1/405; H01Q 1/42; H01Q 1/44; H01Q 1/32; H01Q 1/325;
(Continued)

(56) References Cited

U.S. PATENT DOCUMENTS

2005/0168374 A1 8/2005 Kamiya et al.
2022/0065422 A1 * 3/2022 Caruso ...................... B44F 9/10

FOREIGN PATENT DOCUMENTS

CN 102637951 A 8/2012
DE 102016007119 A1 2/2017
(Continued)

OTHER PUBLICATIONS

International Search Report and Written Opinion of International Searching Authority for PCT/EP2020/087739, ISA/NL, Rijswijk, Netherlands, Dated: Mar. 16, 2021.
(Continued)

*Primary Examiner* — Robert Karacsony
(74) *Attorney, Agent, or Firm* — M&B IP Analysts, LLC

(57) ABSTRACT

The present disclosure relates to a radome for a motor vehicle, including a main body comprising at least one zone transparent to waves emitted by a wave-emitting element, wherein the at least one zone is configured to be traversed by said waves, the at least one zone comprising a face comprising an alternation of first parts covered by at least one layer of paint and second parts not covered by the at least one layer of paint, the first parts and second parts forming at least one decorative pattern and arranged to make the at least one decorative pattern transparent to the waves emitted by the wave-emitting element.

14 Claims, 2 Drawing Sheets

(58) Field of Classification Search
CPC .. H01Q 1/3275; H01Q 1/3291; H01Q 1/3233; H01Q 1/3283
See application file for complete search history.

(56) References Cited

FOREIGN PATENT DOCUMENTS

| | | | |
|---|---|---|---|
| EP | 1560288 | A2 | 8/2005 |
| FR | 3070547 | A1 | 3/2019 |
| KR | 20170047070 | A | 5/2017 |
| WO | 2019038107 | A1 | 2/2019 |

OTHER PUBLICATIONS

First Office Action for CN 202010863603.x, dated Nov. 29, 2024. China National Intellectual Property Administration, Beijing, China.

* cited by examiner

[Fig. 1]
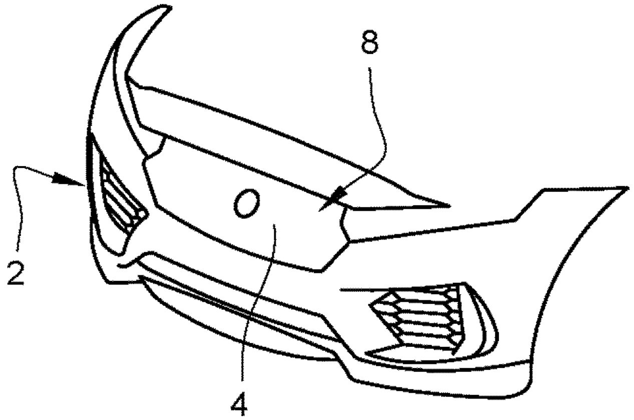
[Fig. 2]
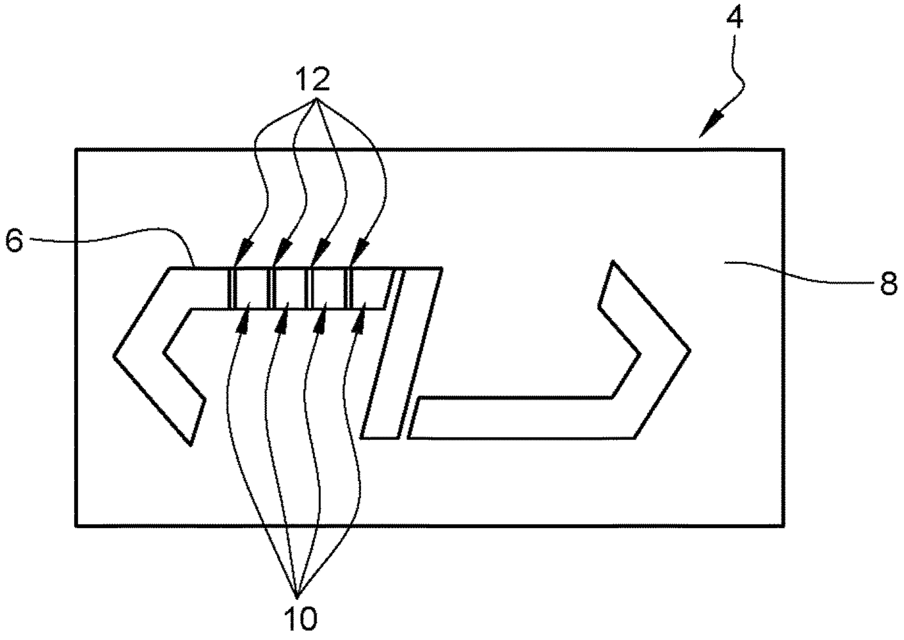

[Fig. 3]
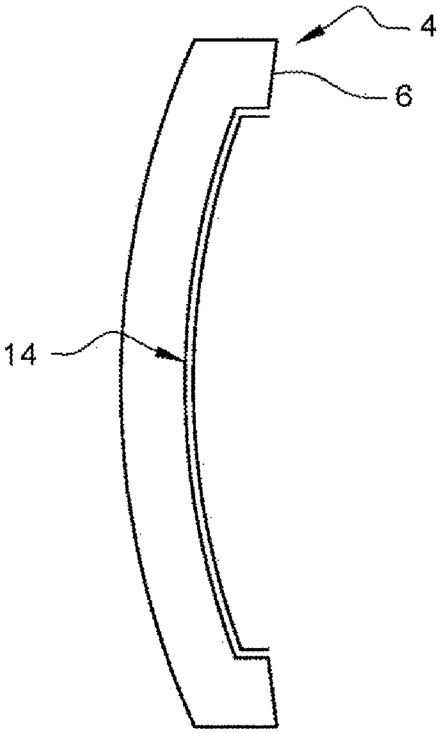
[Fig. 4]
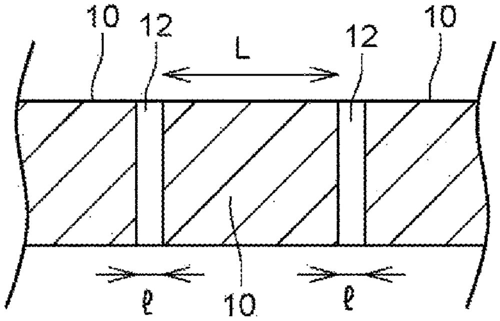
[Fig. 5]
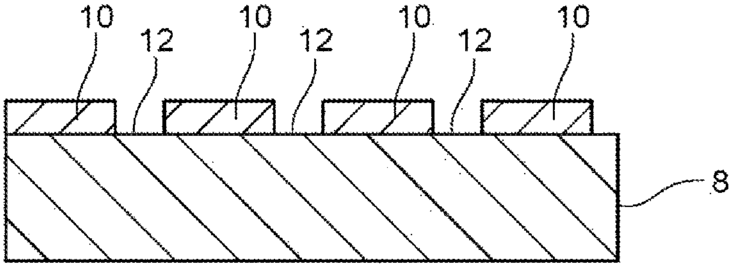

RADOME FOR MOTOR VEHICLE COMPRISING A DECORATIVE PATTERN

The present disclosure relates to motor vehicles equipped with wave-emitting elements, and more particularly the protection devices configured to protect these motor vehicle wave-emitting elements.

An increasing number of motor vehicles have bodywork parts on which wave-emitting elements are mounted. These wave-emitting elements are, for example, one or more radars of the ACC (Adaptive Cruise Control) type emitting radio waves.

Such wave-emitting elements are masked and protected, for example from bad weather, by protection devices commonly called "radomes." In the remainder of the description, the term "radome" is used as a synonym for "protection device."

These radomes are intended to be traversed by the waves emitted by the emitting member(s), and they must therefore be transparent to the latter. "Transparent to the waves emitted by a wave-emitting element" is understood to mean the capacity of a material passed through by an incident wave flow to transmit a fraction greater than 90% of the wave flow passing through it.

To obtain such transparency, the thickness of the region intended to be placed in front of a radar is chosen from a set of attenuation and reflection values of the radar waves/thickness of the region. This set of pairs is obtained, for example, by wave attenuation and reflection measurements and calculations as a function of the thickness, and also as a function of parameters such as the dielectric properties of the materials used to manufacture the part, the varnish or the paint applied to the surface of the part, in particular the different layers and their different thicknesses that make it possible to obtain a paint for automotive application, such as the primer, the base and the varnish.

The use of these protection devices may have an aesthetic purpose, as is for example described in application FR 3 070 547 A1 in which the radome comprises luminous means diffusing light through the radome so as to form a pattern on the surface of the latter, pattern which is visible from the outside of a vehicle on which the radome is mounted. The latter is therefore partly transparent to visible light. The term "transparent to visible light" means that it is at least transparent or translucent to any light radiation having a wavelength comprised in the visible spectrum, that is to say, comprised between about 380 and 780 nm.

The decorative pattern can be produced by covering certain areas with paint opaque to visible light, other areas not being covered by this paint, the lighting of the radome allowing the decorative pattern to appear (area through which the light passes if the pattern is formed by the areas through which the light passes, or does not pass if the pattern is formed by the areas through which the light does not pass).

However, it is possible that the paint used, for example to obtain a high-quality visual rendering, is not transparent to the waves emitted by a wave-emitting element. This poses a problem because some paints are therefore not usable to paint a radome.

Moreover, and even in the case where paints are used that are transparent to the waves emitted by a wave-emitting element, it is possible that the presence of an alternation of zones covered or not covered by said paint may disturb the passage of the waves. In fact, the waves emitted by the wave-emitting element(s) will pass through zones comprising layers of paint (for example primer, then base, then varnish) and zones not comprising said layers. These layers of paint, especially the primer, influence the passage of the waves. The waves therefore pass through different zones, influencing them more or less depending on whether or not these zones are covered with one or more layers of paint. This leads to heterogeneity in the passage of the waves through the radome, and consequently to a reduction in the performance of the wave-emitting element(s). Even the attenuation and the reflection of the overall signal remain low, this heterogeneity in particular complicates the detection of obstacles, making the signal less easily usable.

The object of the present disclosure is in particular to provide a radome allowing a simple solution to this problem of disturbance of the propagation of the waves while preserving a radome having an optimal visual appearance.

To this end, the subject of the present disclosure is a radome for a motor vehicle comprising a main body comprising at least one zone transparent to the waves emitted by the wave-emitting element and intended to be traversed by said waves, the zone comprising a face comprising an alternation of first parts covered by at least one layer of paint and second parts not covered by said layer of paint, the first and second parts forming at least one decorative pattern and being arranged in such a way as to make the decorative pattern transparent to the waves emitted by the wave-emitting element.

Thus, it is chosen to arrange the different areas covered or not covered by one or more layers of paint so as to avoid a disturbance in the passage of the waves through the radome. It is therefore the parameters determined during the production of the first and second parts that make it possible to obtain this facilitated passage.

The radome according to the disclosed embodiments may also comprise at least one of the following features:

- the first parts form strips with a width equal to $(N*\lambda)/4$, N being a non-zero natural whole number and A being equal to the emission wavelength of the wave-emitting element,
- the second parts form strips with a width of less than $\lambda/4$ separated from each other by the first parts,
- the second parts form strips with a width greater than $\lambda/4$ separated from each other by the first parts,
- the spacing between two first consecutive parts is constant,
- the first parts and the second parts are rectilinear strips parallel to each other,
- the first parts and the second parts extend at least in part in a direction perpendicular to a plane in which the waves emitted by the wave-emitting element are propagated,
- all the first parts are all the same width and all the second parts are all the same width,
- the second parts are transparent to visible light,
- the radome comprises a light guide opposite the decorative pattern and arranged to diffuse visible light through the second parts, preferably comprising a bundle of optical fibers,
- a maximum thickness of the radome being less than or equal to 6 mm,
- the main body (8) is made from a material chosen from polymethyl methacrylate, polycarbonate, polypropylene, a polyamide, a copolyester, acrylonitrile butadiene styrene, acrylonitrile styrene acrylate, styrene acrylonitrile, a mixture of acrylonitrile styrene acrylate and polycarbonate, or a mixture of polycarbonate and polyethylene terephthalate, and the first parts are covered with at least one primer layer, one base layer and one varnish layer.

BRIEF DESCRIPTION OF THE FIGURES

The various embodiments will be better understood on reading the description which follows, given solely by way of example and with reference to the appended drawings, in which:

FIG. 1 is a perspective view of a body panel comprising a radome according to an embodiment;

FIG. 2 is a front view of the radome comprising a decorative pattern;

FIG. 3 is a cross-sectional view of the radome according to the embodiment;

FIG. 4 is a front view of a portion of the decorative pattern; and

FIG. 5 is a sectional view of a portion of the decorative pattern.

DETAILED DESCRIPTION

Reference is now made to FIG. 1, which illustrates a body panel 2, here a front bumper, comprising a protection device configured to protect at least one wave-emitting element.

The protection device, also called radome 4, protects a wave-emitting element (not shown) in position on the front face of a motor vehicle behind the radome 4. Hereinafter, we will describe the example of a radar placed behind the radome 4 on the front face of a vehicle. Those skilled in the art will understand that depending on its function, the radar can be mounted in another position of the vehicle, for example on the rear face, on the side faces or on the roof. The number of wave-emitting elements can also vary.

The radome 4 is at least partly intended to be traversed by the waves emitted by the wave-emitting element.

Consequently, it must be at least partially transparent to these waves, at least at a zone transparent to the waves. As explained above, "transparent to the waves emitted by a wave-emitting element" is understood to mean the capacity of a material passed through by an incident wave flow to transmit a fraction greater than 90% of the wave flow passing through it. To allow this, a main body 8 of the radome 4 may be made from a material chosen from PMMA (polymethyl methacrylate), polycarbonate, polypropylene, a polyamide, a copolyester, acrylonitrile butadiene styrene, acrylonitrile styrene acrylate, styrene acrylonitrile, a mixture of acrylonitrile styrene acrylate and polycarbonate, or a mixture of polycarbonate and polyethylene terephthalate.

The radome 4 comprises at least one decorative pattern 6. This decorative pattern 6 is produced by the presence, on the main body 8 of the radome 4, of an alternation of first parts 10 covered by at least one layer of paint and second parts 12 not covered by said layer(s) of paint, for example by a paint that does not allow the waves emitted by the wave-emitting element to pass. For example, the first parts 10 can be covered with a primer, a base and a varnish that does not cover the second parts 12. The number of layers of paint can be different. This does not mean that the second parts 12 are not covered with paint. It is for example possible for the latter to be covered with a layer of varnish (preferably transparent to visible light as will be explained later), sharing or not sharing this layer of paint with the first parts 10.

The face covered by the layer(s) of paint may be the inner face 14 of the main body 8 as shown in FIG. 3 or the outer face of the radome 4.

The first parts 10 and the second parts 12 are arranged in such a way as to allow a homogeneous passage of the waves over the whole of the decorative pattern 6. In other words, the decorative pattern is transparent to these waves as a whole and does not disturb the passage of the waves, causing no additional heterogeneity to the signal.

Hereinafter, we will describe a decorative pattern 6 according to the embodiment placed opposite a radar transmitting at a frequency between 75 and 81 GHz.

In order to allow an optimal passage of the waves, it is possible to ensure that the first parts form strips with a width L equal to $(N^*\lambda)/4$, N being a non-zero natural whole number and A being equal to the emission wavelength of the wave-emitting element. In other words, the first parts 10 have a width that cannot be less than $\lambda/4$ and can be equal to a multiple of $\lambda/4$, within the limit of what it is possible to achieve over the length of the radome 4. The selection of a width of the first parts 10 from among the possibilities resulting from the aforementioned formula makes it possible to optimize and standardize the passage of the waves emitted by a radar.

According to a first variant shown in FIGS. 4 and 5, it is possible for the second parts 12 to form strips with a width I of less than $\lambda/4$ separated from each other by the first parts 10. The narrowness of the second parts 12 allows the radars to be very precise. In other words, and when it is necessary for a radar, by virtue of its function, to collect data as accurately as possible, the second parts 12 form strips with a width less than $\lambda/4$, the reduction of the width allowing the radar to gain in precision.

Conversely, and with the aim of obtaining a backlit decorative pattern 6 as will be explained later (with second parts 12 transparent to visible light), it is possible for the width of the second parts 12 to be greater than $\lambda/4$. This is particularly possible when the function of the radar does not require it to have the finest precision possible. It is even possible for the second parts 12 to have a width I equal to or greater than the width L of the first parts 10.

It is therefore possible to seek a compromise between the precision of the radar and the esthetic appearance by sizing the second parts 12 appropriately.

Preferably, the spacing between two consecutive first parts 10 is constant. This ensures optimum wave passage.

Even more preferentially, the first parts 10 and the second parts 12 form rectilinear strips parallel to each other. This facilitates the passage of the waves emitted by a radar. It is, however, possible for them to form wavy or curved strips (it is then possible to have a constant spacing as described above).

In order to facilitate the passage of the waves emitted by a radar, it is possible for the first parts 10 and the second parts 12 to extend at least in part in a direction perpendicular to a plane in which the waves emitted by a radar are propagated. In other words, the wave-emitting element emits waves propagating in a given plane (traditional radars have unidirectional polarization), conventionally (but not necessarily) in a horizontal plane for a motor vehicle radar. In this case, the first parts 10 and the second parts 12 are vertical. In the case of non-rectilinear strips, the latter may extend partly in a direction perpendicular to a plane in which the waves emitted by a radar are propagated.

It is also possible that all the first parts 10 have the same width and all the second parts 12 have the same width. There is therefore repetition of a preferential pattern, for example for the passage of waves. It is alternatively possible to vary the thicknesses of the first parts 10 (respecting the formula $(N^*\lambda)/4$) as well as those of the second parts 12.

In general, the arrangement of the lines forming the decorative pattern 6 can vary according to the emission frequency of the wave-emitting element and the desired result by respecting the formula stated above.

The purpose of making the second parts 12 may be to make a backlit pattern as explained above. The second parts 12 can therefore also be transparent to visible light (as can the possible layer(s) of paint covering these parts). The term "transparent to visible light" means that it is at least transparent or translucent to any light radiation having a wavelength comprised in the visible spectrum, that is to say, comprised between about 380 and 780 nm.

It is therefore possible to place, opposite the decorative pattern 6, a diffusing light guide arranged so as to diffuse visible light through the second parts 12. This means that the light exit surface is formed by a lateral face of the light guide. As a result, the light emerges from the diffusing light guide in a substantially radial direction and the distributed luminous flux is substantially constant at all points on the exit surface of the diffusing portion of the diffusing light guide. The light diffused by the latter comes from at least one light source, which may for example include a plurality of light-emitting diodes (LEDs), the light source being able to be offset (i.e. situated outside the zone traversed by the waves and also advantageously outside the zones affected by small impacts, such as "parking" impacts).

The diffusing light guide can be formed by a plurality of optical fibers.

The optical fibers are made from plastic. They can also be made of glass. They can be arranged in a layer. It is possible to obtain a radial light output by treating the optical fibers by sandblasting or even by laser scraping in order to deteriorate the surface of the latter.

The attenuation of the radar waves by a layer of optical fibers was measured with certified equipment for checking the electromagnetic transparency of the radomes. For example, a measurement was carried out for optical fibers made from PMMA, with a diameter of 500 μm, and woven with a polyester thread. The layer thus woven, 1 mm thick, was placed between two polycarbonate plates 3 mm thick each.

In the 76 to 77 GHz band (ACC radar emission range), the attenuation due to the two polycarbonate plates alone (without layer of optical fibers), measured in transmission ("one way," in one direction through all three layers), is 1.39 dB. At these same frequencies, the whole of the layer of optical fibers and of the two polycarbonate plates has an attenuation of 0.65 dB. The overall attenuation (measured one-way) is below the car manufacturers' specification for a radome (for example, 1.5 dB). The measurements show that the layer of optical fibers is transparent to electromagnetic waves at 77 GHz and that the attenuation is due to the thickness of the two polycarbonate plates.

The attenuation can be improved by adjusting the thicknesses of the two polycarbonate plates. Such a light guide therefore does not disturb the operation of a radar.

Alternatively, the diffusing light guide may be composed of transparent plastics films made of extruded polycarbonate and having a light transmission rate greater than or equal to 90% according to the ISO 13468-2 standard, and a refractive index of 1.584 according to the ISO 62 standard.

The presence of a diffusing light guide makes it possible to illuminate the decorative pattern 6. It is possible to replace the above light guide with any light source known to those skilled in the art and capable of allowing backlighting of the decorative pattern 6.

In order to ensure transparency to the waves, it is also advantageous to limit the maximum thickness of the radome 4 (main body 8+layer(s) of paint) to less than or equal to 6 mm.

Concerning the realization of the decorative pattern 6, it is possible to paint the whole of the radome 4 (for example the outer face of the radome 4 visible from the outside of a motor vehicle on which the body panel 2 is mounted), then to remove the desired layer(s) of paint by laser scraping to form the second parts 12. Depending on the result that one wishes to obtain, in particular in the case of a backlit pattern, the quantity of scraped paint (for the production of the second parts 12) may vary.

The present disclosure is not limited to the embodiments described here, and other embodiments will become clearly apparent to a person skilled in the art.

It is in particular possible to create a decorative pattern by means other than those described above.

It is also possible to use materials other than those mentioned above and having the same properties as the latter, in particular transparency to waves.

What is claimed is:

1. A radome for a motor vehicle, characterized in that it comprises:

a main body comprising at least one zone transparent to waves emitted by a wave-emitting element, where the at least one zone is configured to be traversed by said waves, wherein the at least one zone comprises a face comprising an alternation of first parts covered by at least one layer of paint and second parts not covered by said at least one layer of paint, wherein the first parts have equal widths that separate the second parts to form at least one decorative pattern that is transparent to the waves emitted by the wave-emitting element, wherein the first parts form strips with the width equal to $(N*\lambda)/4$, N being a non-zero natural whole number and A being equal to emission wavelength of the wave-emitting element.

2. The radome according to claim 1, wherein the second parts form strips with a width of less than $\lambda/4$ separated from each other by the first parts.

3. The radome according to claim 1, wherein the second parts form strips with a width greater than $\lambda/4$ separated from each other by the first parts.

4. The radome according to claim 1, wherein a spacing between two consecutive first parts is constant.

5. The radome according to claim 4, wherein the first parts and the second parts are rectilinear strips parallel to each other.

6. The radome according to claim 1, wherein the first parts and the second parts extend at least in part in a direction perpendicular to a plane in which the waves emitted by the wave-emitting element are propagated.

7. The radome according to claim 1, wherein all the first parts are all a same width and all the second parts are all the same width.

8. The radome according to claim 1, wherein the second parts are transparent to visible light.

9. The radome according to claim 3, wherein the radome comprises a light guide opposite the at least one decorative pattern and arranged to diffuse visible light through the second parts.

10. The radome according to claim 1, a maximum thickness of the radome being less than or equal to 6 mm.

11. The radome according to claim 1, wherein the main body is made from a material chosen from any one of: polymethyl methacrylate, polycarbonate, polypropylene, a polyamide, a copolyester, acrylonitrile butadiene styrene, acrylonitrile styrene acrylate, styrene acrylonitrile, a mixture of acrylonitrile styrene acrylate and polycarbonate, and a mixture of polycarbonate and polyethylene terephthalate.

12. The radome according to claim 1, wherein the first parts are covered with at least one primer layer, at least one base layer, and at least one varnish layer.

13. A radome for a motor vehicle, characterized in that it comprises:

a main body comprising at least one zone transparent to waves emitted by a wave-emitting element, where the at least one zone is configured to be traversed by said waves, wherein the at least one zone comprises a face comprising an alternation of first parts, covered by at least one layer of paint, and second parts, not covered by said at least one layer of paint, wherein the first parts and second parts form at least one decorative pattern that is transparent to the waves emitted by the wave-emitting element, wherein the waves have a wave frequency between 75 GHz and 81 GHZ, and wherein the first parts form strips with a width equal to $(N*\lambda)/4$, N being a non-zero natural whole number and $\lambda$ being equal to an emission wavelength of the wave-emitting element.

14. A radome for a motor vehicle, characterized in that it comprises:

a main body comprising at least one zone transparent to waves emitted by a wave-emitting element, where the at least one zone is configured to be traversed by said waves, wherein the at least one zone comprises a face comprising an alternation of first parts covered by at least one layer of paint and second parts not covered by said at least one layer of paint, wherein the first parts have equal widths that separate the second parts to form at least one decorative pattern that is transparent to the waves emitted by the wave-emitting element, and wherein the second parts are transparent to visible light.

* * * * *